United States Patent [19]

Ivony et al.

[11] 4,455,035
[45] Jun. 19, 1984

[54] ANTI-JACKKNIFING DEVICE WITH FRICTION BRAKE FOR ARTICULATED MOTOR VEHICLE

[76] Inventors: József Ivony, Hegedüs u. 50. 1133; István Ratskó, Zolyomi ut 13. 1118; György Karászy, Kökörcsin u. 2. 1113; Jeno Mádi, Prodám u. 1. 1156, all of Budapest, Hungary

[21] Appl. No.: 349,674

[22] Filed: Feb. 17, 1982

[30] Foreign Application Priority Data

Feb. 21, 1981 [HU] Hungary ............................... 426/81

[51] Int. Cl.³ ............................................. B62D 53/06
[52] U.S. Cl. ................................................... 280/432
[58] Field of Search ..................... 280/432, 446 B, 474

[56] References Cited

U.S. PATENT DOCUMENTS 4,109,929 8/1978 Koroknay ........................... 280/432
4,344,640 8/1982 Ratsko et al. ...................... 280/432

*Primary Examiner*—John A. Pekar
*Attorney, Agent, or Firm*—Gabriel P. Katona

[57] ABSTRACT

A anti-jackknifing device for a motor vehicle having two articulated units with a friction brake therebetween has a hydraulic control means for controlling the torque applied by the brake. A hydraulic sensor activating cylinder with two working spaces senses the jackknifing angle between the two units. A three-position four-way reversible valve is connected to the hydraulic brake activating cylinder, between a third port and a check valve and the valve in its first position connects its first and third ports and its second and fourth ports and in its second position connects its first and fourth ports and its second and third ports. A steering angle sensor is provided which determines the desired jackknifing angle therefor. In response to the deviation of the actual jackknifing angle from the desired jackknifing angle, the valve is actuated into its first position when the actual jackknifing angle is overdriven in the clockwise direction and into its second position when the actual jackknifing angle is overdriven in the counter-clockwise direction.

5 Claims, 4 Drawing Figures

ANTI-JACKKNIFING DEVICE WITH FRICTION BRAKE FOR ARTICULATED MOTOR VEHICLE

BACKGROUND OF THE INVENTION

The invention relates to an anti-jackknifing device with a friction brake for an articulated motor vehicle, where one of the braked elements of the friction brake is connected to the front vehicle, the other one to the trailer, and it has brake-actuating control unit which controls the brake by influencing the selected run-dynamic characteristic of the motor vehicle.

Several devices are known for preventing the articulated motor vehicle from abnormal jackknifing, in which the anti-jackknifing torque is produced by a friction brake system around the articulation connecting the two vehicles.

In the device described in the U.S. Pat. No. 4,109,929, a brake disc is fixed on the trailer and the surrounding brake bracket carrying the friction linings is guided in the slot of the coupling of the semi-trailer tractor. The brake system is hydraulically operated, controlled with the control unit influenced with the differential pressure prevailing in the double actuation space of the hydraulic power-assisted steering unit. When the articulated vehicle travels straight line same liquid pressre prevails in the actuating spaces of the power-assisted steering unit, and since there is no differential pressure, the control unit does nor receive an influencing signal, consequently the brake actuating cylinder is kept by the control unit in constant connection with the source of the pressure medium and the friction brake is in the braked condition. When the vehicle travels straight, the device produces an advantageous effect against lateral deviations of the trailer, but in a curve it produces reduced torque against the jackknifing angle variation in order to allow the turn of the articulated motor vehicle, as a result of which it produces insufficient pressure in the curve against the abnormal jackknifing angle variation. Increasing torque is produced by the device in the curve only when the driver steers the front wheels towards the mid-position of the steering mechanism, i.e. when the driver corrects the arc of travel.

Also known are such frictional anti-jackknifing devices, where the torque produced by the brake against the jackknifing angle variation depends on the extent of the jackknifing angle, irrespective of the angle of the steered wheel.

In another known solution, the friction brake producing the torque against the jackknifing angle variation is interconnected and synchronized with the air brake system braking the wheels of the motor vehicle.

SUMMARY OF THE INVENTION

The invention is aimed at the realization of such anti-jackknifing device, which produces the maximum torque against the jackknifing angle variation through a friction-lined brake system when abnormal jackknifing angle variation occurs in relation to the jackknifing angle variation ascertainable to the steering angle of the steered wheels and to the jackknifing angle of the two vehicles, irrespective of the fact whether the vehicle travels straight, in a curve or the brake system is actuated.

The objective is intended to be attained with a torque producing friction brake system, since the friction brake in moderately pretensioned condition is capable to damp the swing of the trailer and its arrangement is more favorable in many cases, than in such device where hydraulic actuating mechanism with confined space produces the torque against the increase of the jackknifing angle.

The objective is attained by connecting a hydraulic control unit to the hydraulic brake cylinder of the actuating brake system, where the output signal of the sensor sensing the steering angle of the front wheels is transmitted as an input signal to the control unit, and the output signal of the sensor sensing the jackknifing angle is transmitted as a second input signal, the input signals transmit magnitude and direction information, which are processed according to the regularity programmed by the control unit and accordingly the output signal is transmitted by actuating the friction brake.

The invention relates to an anti-jackknifing device for an articulated motor vehicle with friction brake, the friction elements of which moving in relation to each other are connected to the articulated motor vehicle units with jointing spots arranged around the articulation so as to produce torque, the friction brake has a hydraulic actuating cylinder connected to the hydraulic control unit, the sensor of which sensing the jackknifing angle is formed as a double action hydraulic pistoned cylinder, the first actuating space of which is connected to the first port or junction of a three position four-way pistoned reversible valve of the hydraulic control unit, the second actuating space is connected to the second junction of the reversible valve, the third junction of the reversible valve with the fourth junction is connected by the inner hydraulic loop provided with a check valve and arranged in a position shutting off the flow from the direction of the third junction towards the fourth junction, the friction brake-actuating cylinder is connected to the section of the hydraulic loop between the check valve and third junction, in the intermediate position of the piston of the reversible valve suitably all junctions, but at least the first, second and fourth junctions are in communication with each other, in the first deflected position of the piston the first and third junction, as well as the second and fourth junctions are in communication with each other, in the second deflected position the first and fourth junctions as well as the second and third junctions are in intercommunication, the reversible valve is in functional connection with the angle position indicator unit of the control unit, which has a sensor element sensing the steering angle, another sensor element sensing the jackknifing angle, the angle position indicator unit has two output signals determining the jackknifing angle different from the jackknifing angle ordered to the steering angle of the front wheel, the first deflected position of the reversible valve is ordered to one of the output signals when the trailer is in the overdriven position in clockwise direction in top view of the vehicle from the jackknifing angle ordered to the steering angle of the wheel, the second deflected position of the piston of the reversible valve is ordered to the second output signal of the angle position indicator unit when the trailer is in the overdriven position in anticlockwise direction in top view of the vehicle from the jackknifing angle ordered to the steering angle of the wheel. The double action hydraulic pistoned cylinder is built in so as to reduce the volume of the first actuating space at clockwise jackknifing of the trailer in top view of the motor vehicle.

BRIEF DESCRIPTION OF THE DRAWINGS

The invention is described in detail in

FIGS. 1-4., by way of three examples in which:

FIG. 1: Block diagram of the antijackknifing device in the motor vehicle, showing the reference numbers necessary for description of its operation, FIG. 2: Hydraulic part and control unit, FIG. 3: Hydraulic part and control unit with the rocker fitted angle position indicator, and FIG. 4: Hydraulic part and control unit with the two-armed lever fitted angle position indicator.

DETAILED DESCRIPTION OF THE INVENTION

Figure 1:
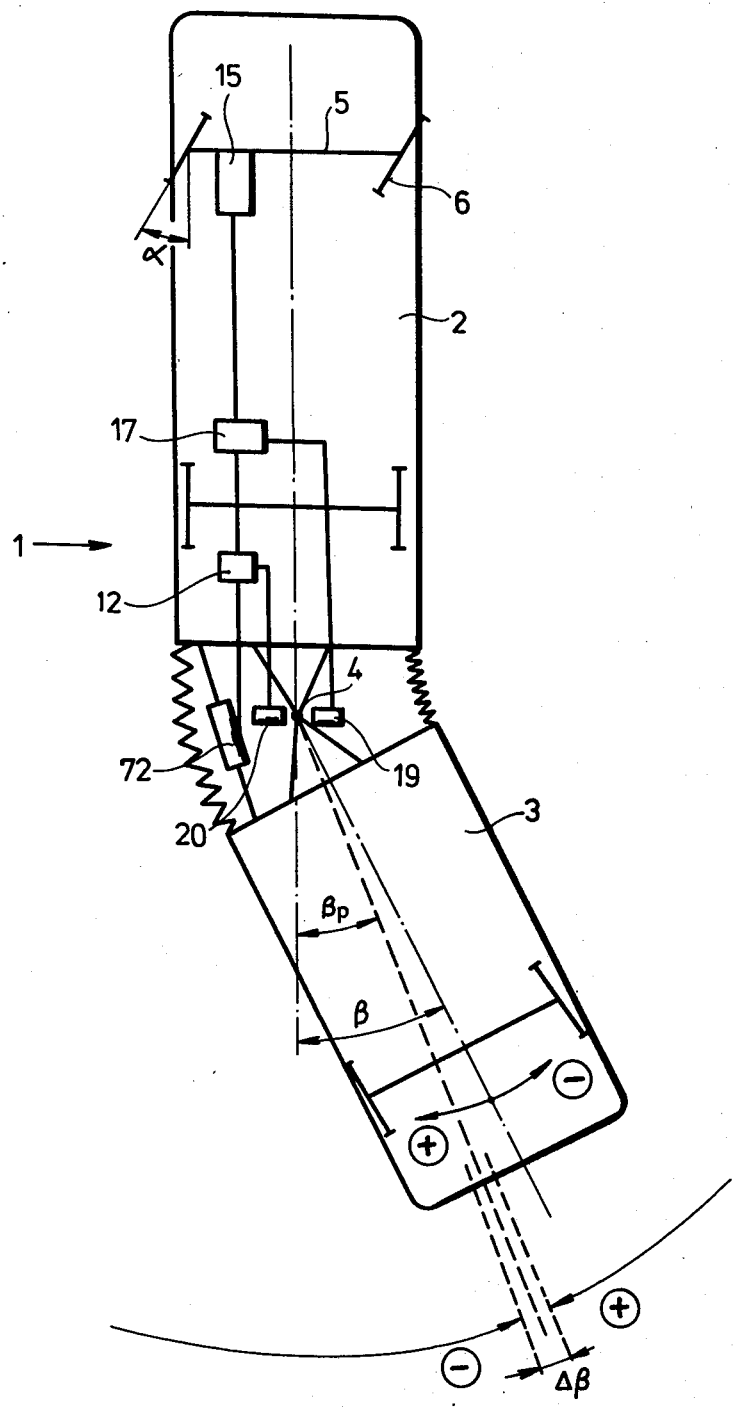

The articulated vehicle 1 includes two vehicle units, front vehicle 2 and trailer 3, interconnected with articulation 4. The front axle 5 of the front vehicle 2 is steered, the steering angle of the front wheels 6 is marked with $\alpha$ in the diagrams. The jackknifing angle of the front wheel 2 and trailer 3 is marked with $\beta$.

Figure 2:
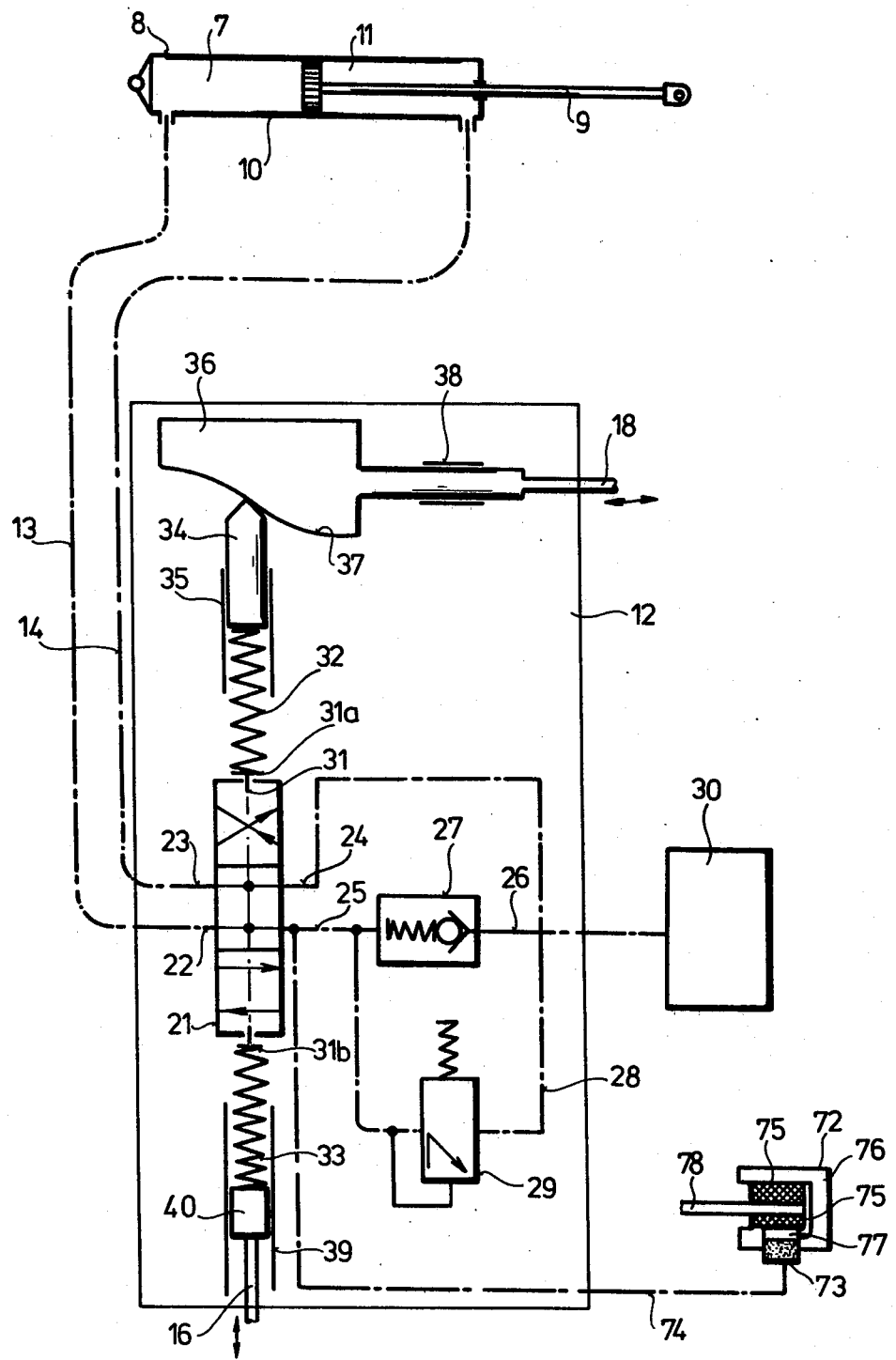

The sensor unit 15 sensing the steering angle of the wheel is fitted to the non-illustrated steering mechanism of the front axle 5, the jackknifing angle sensor unit 19 is built in between the front vehicle 2 and trailer 3, both are connected to the angle position indicator unit 17, which gives the direction of deviation of the actual jackknifing angle $\beta$ from the fixed jackknifing angle $\beta$ corresponding to the steering angle $\alpha$ of the front wheel 6 in the form of an output signal. The jackknifing angle $\beta_p$ corresponding to the steering angle $\alpha$ of the front wheel 6 is the constant jackknifing angle $\beta_p$ developing when the steering angle $\alpha$ is kept at a constant value and in the case of skidproof rolling of the wheels on a flat road. Jackknifing sensor 20 sensing the direction of jackknifing angle $\beta$ variation is arranged between the front vehicle 2 and trailer 3 connected to the hydraulic control unit 12 together with the angle position indicator unit 17. The control unit 12 is in actuating connection with the friction brake system 72, one of the mobile friction elements of which is connected to the front vehicle 2 and the other one to the trailer 3. The sensor unit sensing the steering angle of the front wheel 6 is formed as the steering signal device 15 fitting to the non-illustrated steering mechanism and as the transmitting element 16 connected to the signal device. The jackknifing angle sensor unit 19 formed as the element sensing the extent and direction of the jackknifing angle $\beta$ is formed as the jackknifing angle signal device 19 built in between the front vehicle 2 and trailer 3 and as the intermediate member 18 connected to the signal device. The jackknifing sensor unit 20 is formed as double action hydraulic pistoned actuating cylinder 8, the cylinder 10 of which is fixed to the front vehicle 2 and its piston 9 to the trailer 3. The control element of the hydraulic control unit 12 is formed by the three position, four-way hydraulic reversible valve 21 the first junction 22 of which is connected to the first actuating space 7 of the hydraulic cylinder 8 with conduit 13, and the second junction 23 is connected to the second actuating space 11 with conduit 14. The third junction 25 of the hydraulic valve 21 is interconnected with the fourth junction 24 by the conduit forming the inner hydraulic loop 26 and is provided with check valve 27 shutting off the flow from the direction of the third junction 25 towards the fourth junction 24. In the stationary intermediate position of piston 31 of the three position, four-way reversible valve 21 all four junctions 22, 23, 24, 25 are in intercommunication, in the first control postion the first 22 and third junction 25, as well as the second 23 and fourth junction 24 are in intercommunication, while in the second control position the first 22 and fourth junction 24 as well as the second 23 and third junction 25 are in intercommunication. The check valve 27 is surrounded by the parallel connected outer hydraulic loop 28, in which the pressure control valve 29 is arranged, which controls the fluid pressure in the conduit section between the third junction 25 and check valve 27. The hydraulic tank 30 is connected to the conduit branch between the pressure control valve 29 and fourth junction 24. The three position, four-way reversible valve 21 is actuated with electromagnets. In the example given in FIG. 2 a more complicated mechanical actuation is shown. The hydraulic valve is provided with piston 31, the front surface 31a of which supports spring 32 pressed on by sensor 34 resting on the guide track 37 and forming the outlet of the jackknifing angle signal device 36 guided in conduit 35. Exit of the jackknifing angle signal device 36 is formed as a guide bar guided in conduit 38 and is in motion transmitting connection with the jackknifing angle signal device 17 through the intermediate member 18. The other front surface 31b of the piston 31 supports spring 33 connected to the steering signal device 15 by the piston 40 forming the outlet guided in conduit 39.

Length of the spring 31 is selected so as to have the path of the spring longer than the maximum movement of the sensor piston 34. Similarly the path of spring 33 is longer than the maximum movement of the steering signal device 40.

Hydraulic actuating cylinder 73 arranged in brake bracket 76 actuating the brake shoe 75 of friction brake 72 is connected through conduit 74 into the section of the hydraulic loop 26 between the third junction 25 and check valve 27, the piston 77 of which rests on the brake shoe 75. The brake shoes 75 surround the brake rod 78. The brake bracket 76 is connected to the trailer 3, the brake rod 78 to the front vehicle 2. The brake rod 78 may be formed as a friction element of optional construction surrounded by the brake shoes 75, for instance as a brake disc.

Figure 3:
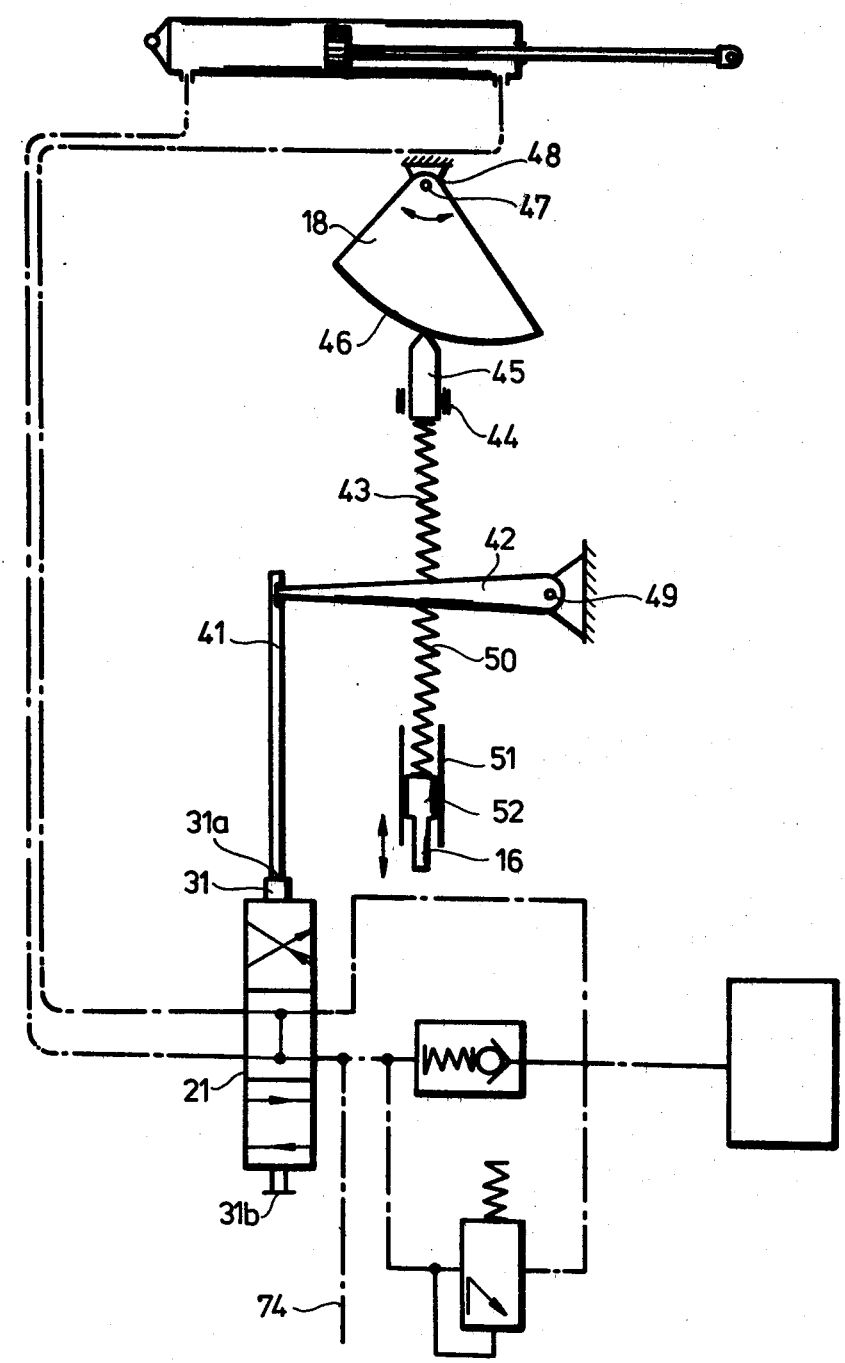

In the construction shown in FIG. 3 similarly to the one described above, the equilibrium of the springs fixes the position of the piston 31 of the three position, four-way reversible valve 21 indirectly with the aid of the lever. Piston 31 of the hydraulic valve 21 is connected to the pushrod 41 without deadplay in motion transmitting connection with rocker 42 embedded in pin 48, springs 50 and 43 supported by rocker 42, and spring 43 is compressed by sensor piston 45 guided in slide 44 resting on guide track 46. The guide track 46 is formed on segment 47 revolving around pin 48 being in motion-transmitting connection with the jackknifing angle signal device 17 through the intermediate member 18. Spring 50 is pressed to rocker arm 42 by the outlet of steering signal device 52 formed as a piston guided in conduit 51, said rocker arm 42 is connected with the steering signal device 15 through the intermediate member 16.

Figure 4:
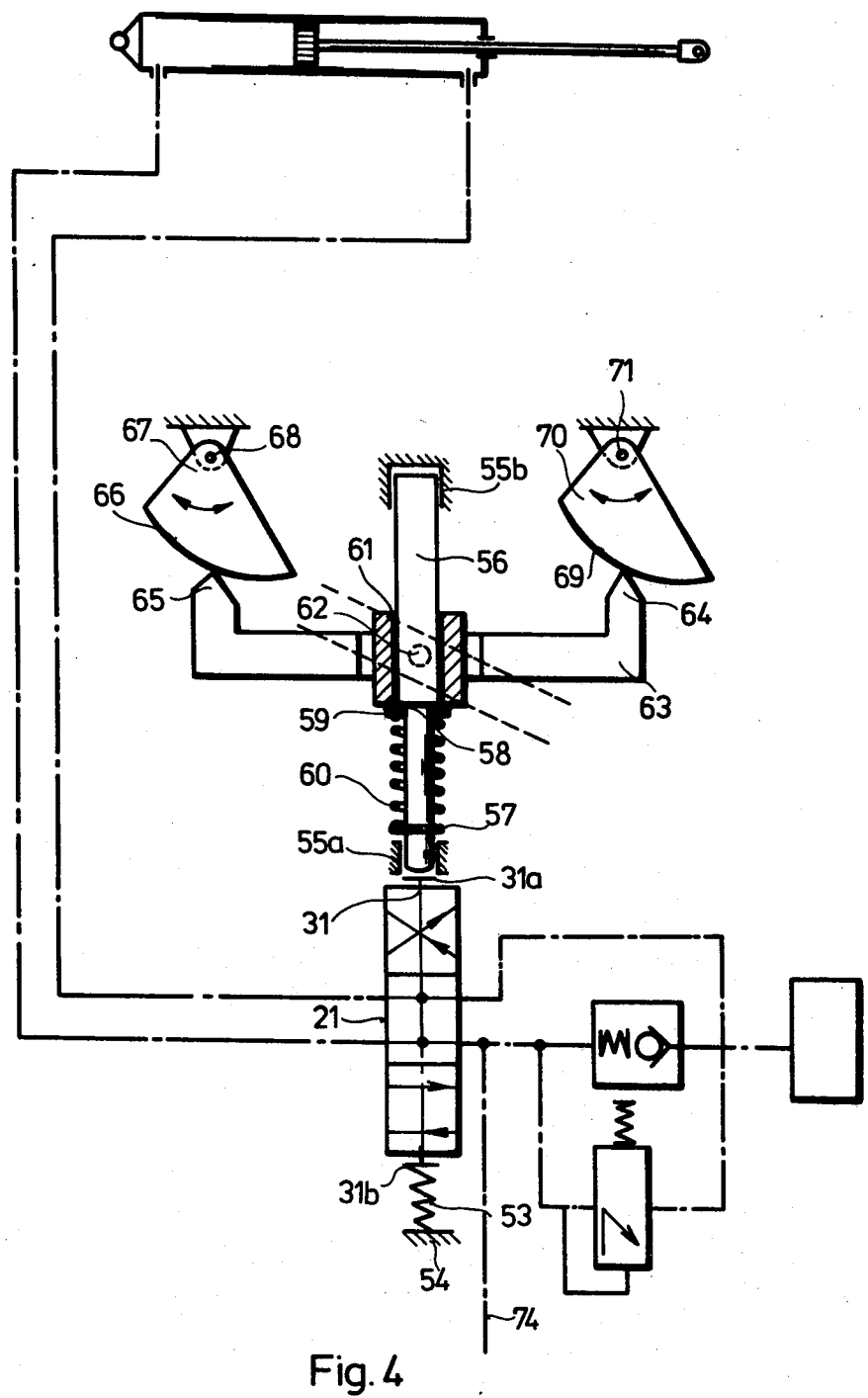

In the construction shown in FIG. 4, the front face 31b of piston 31 of the hydraulic valve 21 supports the pretensioned compression spring 53, the other end of which is seated on the fixed support 54. Piston 58 guided in bushes 55a and 55b rests on the front face 31 of piston 31. Spring holding ring 57 is fixed to piston 56, supporting one end of the compression spring 60—the pretensioned force of which is greater than the spring force arising in any position of the spring 53—while the other end presses the supporting ring 59 against the shoulder 58 of piston 56. In the intermediate position of piston 31 the guide bush 61 is over the supporting ring 59 to the cross pin 62 of which a sensor is fitted formed as two-armed lever 63.

One of the contact surfaces 65 of the two-armed lever 63 rests on the outlet of jackknifing angle signal device provided with guide track 66 formed as segment 67 arranged on pin 68. The swing segment 67 is in motion transmitting connection with the jackknifing angle signal device 17 through intermediate member 18.

The other contact surface 64 of the two-armed lever 63 rests on the outlet of the steering angle signal device provided with guide track 69 formed as swing segment 70 arranged on pin 71.

The outlet of the steering angle signal device 16 formed as swing segment 70 is in motion transmitting connection with the steering angle signal device 15 through the intermediate member 16.

The apparatus functions as follows:

During continuous travel of the articulated vehicle 1, the jackknifing angle $\beta_p$ of fixed value is ordered to the existing angle deviation $\alpha$ of the steered wheels 6 on the front axle 5, i.e. to the steering angle of the wheels, assuming skidproof rolling of the wheels. The steering angle of the front wheels 6 is sensed by signal device 15, the jackknifing angle by the jackknifing angle sensor unit 19, the output signal of both is transmitted to the indicator unit, the construction of which is such, that the jackknifing angle $\beta_p$ is ordered to each steering angle $\alpha$. The angle position indicator 17 compares the two output signals and ascertains the deviation of the actual jackknifing angle and the extent of deviation from the jackknifing angle $\beta_p$ ordered to the steering angle $\alpha$. In case of deviation—depending on the direction—the angle position indicator unit 17 emits two signals to the hydraulic control unit 12, which in case of incorrect change of direction of the jackknifing angle, coacting with the jackknifing sensor unit 20 formed as hydraulic actuator, produces actuating pressure on the hydraulic outlet of the hydraulic control unit 12 connected to the actuating cylinder 73 of the friction brake 72, said hydraulic outlet actuates the brake shoes 75 and produces torque around the articulation 4 of the front vehicle 2 and trailer 3 against he jackknifing angle variation.

Operation of the hydraulic device is described in detail as follows:

In the intermediate position of piston 31 the reversible valve 21 ensures direct hydraulic connection between the first 22 and second junction 23. The piston 9 moves freely in both directions in the cylinder 6, since the connection between the first 10 and second actuating space 11 is ensured through the conduits 13 and 14. In the intermediate position of the reversible valve 21 extended with control dead-play, the apparatus has no resistance against the jackknifing process. When the reversible valve 21 moves towards the end part 31b of piston 31, hydraulic communication is brought about between the second 23 and fourth junction 24.

If meanwhile the piston rod 9 of the hydraulic cylinder 7 moves in the direction of compression, it presses the fluid out of the actuating space 10, upon which the fluid pressure increases, since the piston 9 forces the fluid from the third junction 25 towards the check valve 27, which shuts in this flow direction. Thus fluid flows through the hydraulic conduit 74 into the cylinder 73, the piston 77 of which compresses the brake shoes 75 supported by the brake rod 78 and produces torque on the brake rod 78 against jackknifing angle variation. As soon as the jackknifing angle $\beta_p$ ordered to the steering angle $\alpha$ of the wheels coincides with the actual jackknifing angle $\beta$ of the trailer 3, the piston 31 returns into the intermediate position and thereby the fluid pressure in the brake cylinder 73 is reduced and the torque is stopped against the jackknifing angle variation.

At the same time the maximum pressure developing in the brake cylinder 73 is limited in the fluid system by the pressure control valve 29 parallel connected with the check valve 27, which allows variation of the jackknifing angle in the direction of braking without the development of dangerous forces at the maximal braking force arising at maximum fluid pressure.

When in the first controlled position of the three-position, four-way reversible valve 21 the actuating piston 9 of the actuating cylinder 7 moves in the direction of expansion, it forces the fluid out of the actuating space 11, and the fluid leaving the fourth junction 24 freely flows in the hydraulic cylinder 26 to the third junction 25, since the check valve 27 opens in this direction. The pressure develops in the hydraulic cycle necessary for opening the check valve 27, while no appreciable friction force arises in the brake 72.

The first deflected position of the piston 31 of the three-position, four-way reversible valve 21 occurs when the trailer 3 is in the overdriven position in the clockwise direction in the top view of the vehicle 1 from the jackknifing angle $\beta_p$ ordered to the steering angle $\alpha$ of the wheel.

The piston 31 of the three-position, four-way reversible valve 21 is in the second deflected position when the trailer 3 is in the overdriven position—in the anticlockwise direction in the top view of the vehicle 1 from the jackknifing angle $\beta_p$ ordered to the steering angle $\alpha$ of the wheel.

In this case the second junction 23 is in intercommunication with the third junction 25 and the first junction 22 with the fourth junction 24. When the piston 9 of the actuating cylinder 7 moves in the direction of the expansion, it forces fluid out of the actuating space 11, and the fluid leaving the third junction 25 flows through the conduit 74 into the brake cylinder 73, the pressure increases, since the check valve 27 shuts from the direction of the third junction towards the fourth junction 24. As a result of the increased fluid pressure, the brake cylinder 73 produces compressive force through the brake shoes 75, whereby torque arises on the brake rod 78 against the jackknifing angle variation.

When in the second controlled position of the three-position, four-way reversible valve 21 the piston 9 of the actuating cylinder 7 moves in the direction of compression, it forces fluid out of the actuating space 10, then leaving the fourth junction 24 it freely flows in the hydraulic cylinder 26 to the third junction 25, since the check valve 27 opens in this direction. Pressure develops in the hydraulic cycle necessary only for opening the check valve 27, and no appreciable force arises in the brake 72.

The described operation of the apparatus is conditional on the specific installation of the actuating cylinder 7 between the front vehicle and trailer 3. In the given example during clockwise jackknifing of the trailer 3—in the top view of the motor vehicle 1—the piston 9 moves in the direction of compression, consequently in this case the volume of the actuating space 10 decreases.

The brake system 72 producing the torque around articulation 4 against the jackknifing angle variation is preferably formed as a disc brake, naturally any type of friction brake is acceptable, the friction elements of which moving in relation to each other are connected to the units of the articulated motor vehicle, i.e. to the front vehicle, trailer and intermediate member, by the connection spots arranged in the articulation so as to produce torque.

The apparatus is suitable for developing such construction—by selecting the diameter of the actuating cylinder 7 and the fixing spots of the coupling between the front vehicle 2 and trailer 3—so as to allow locking, i.e. to prevent the jackknifing angle variation in fixed direction.

What we claim is:

1. In an antijackknifing device for a motor vehicle having two articulated units with a friction brake therebetween having a hydraulic brake actuating cylinder, the improvement comprising hydraulic control means for controlling the torque applied by the brake including: first means comprising a hydraulic sensor actuating cylinder with two working spaces for sensing the jackknifing angle between the two units; a three-position four-way reversible valve having a first port connected to a first actuating space of the sensor actuating cylinder, a second port connected to the second actuating space, a third port connected to the fourth port in a loop with a check valve preventing flow in the direction from the third toward the fourth port and the hydraulic brake actuating cylinder connected between the third port and the check valve, wherein the valve in its first position connects the first and third ports and the second and fourth ports and in its second position connects the first and fourth ports and the second and third ports; means for sensing the steering angle; and means for determining the desired jackknifing angle for the sensed steering angle and in response to the deviation of the actual jackknifing angle from the desired jackknifing angle for actuating the valve into its first position when the actual jackknifing angle represents that the two units of the vehicle are overdriven in the clockwise direction and into its second position when the actual jackknifing angle indicates that the two units of the vehicle are overdriven in the counter-clockwise direction, whereby the brake will act to prevent a worse overdriven condition.

2. The device according to claim 1, further comprising a hydraulic tank connected to said loop.

3. The device according to claim 1, wherein the valve comprises a valve piston and the valve actuating means comprises a first sensor piston connected to the steering angle sensing means and to the valve piston via a spring, a guide cam connected to the first jackknifing angle sensing means, a second sensor piston engaging the cam surface of the guide cam and connected to the valve piston via a spring.

4. The device according to claim 1, wherein the valve comprises a valve piston and the valve actuating means comprises a first sensor piston connected to the steering angle sensing means, a pivotally mounted cam member connected to the jackknifing angle sensing means, a second sensor piston engaging the cam surface of the cam member, a pivotally mounted rocker cam, a lever connecting the rocker arm to the valve piston and two compression springs connecting the two pistons to the rocker arm with the rocker cam therebetween.

5. The device according to claim 1, wherein the valve comprises a valve piston and the valve actuating means comprises a first pivotally mounted cam member connected to the steering angle sensing means, a second pivotally mounted cam member connected to the jackknifing angle sensing means, a slidably mounted differential arm having sensors engaged with the cam surfaces of the two cam members, a spring biased contact member connecting the differential arm to the valve piston.

* * * * *